United States Patent [19]

Nakao

[11] 4,106,663
[45] Aug. 15, 1978

[54] MEANS FOR OPENING AND CLOSING A LID OF CASSETTE TAPE RECEIVER PORTION

[75] Inventor: Toshihiro Nakao, Hachioji, Japan

[73] Assignee: Olympus Optical Co., Ltd., Tokyo, Japan

[21] Appl. No.: 805,171

[22] Filed: Jun. 9, 1977

[30] Foreign Application Priority Data

Jun. 11, 1976 [JP] Japan ............................ 51-76136[U]

[51] Int. Cl.² ........................................... B65D 45/16
[52] U.S. Cl. ................................... 220/326; 220/335; 220/343
[58] Field of Search ................. 220/326, 334, 335, 343

[56] References Cited

U.S. PATENT DOCUMENTS

| 2,245,487 | 6/1941 | Machin ........................... 220/335 X |
| 3,432,967 | 3/1969 | Simon ................................... 220/326 |

*Primary Examiner*—George T. Hall
*Attorney, Agent, or Firm*—Toren, McGeady and Stanger

[57] ABSTRACT

For opening and closing a lid on the cassette tape receiver portion of a tape recorder a casing having an opening portion is provided with a lid body having a projection formed at a side end to be rotated for opening and closing the opening portion of the casing. A spring plate rotatably supports the lid body through a hinge connection including a mandrel. The spring plate is directed downwards and its free end portion is bent upwards against the side end fixed in the casing, and an abutment provided in the casing engages the projection of the lid body when closing the lid body.

5 Claims, 11 Drawing Figures

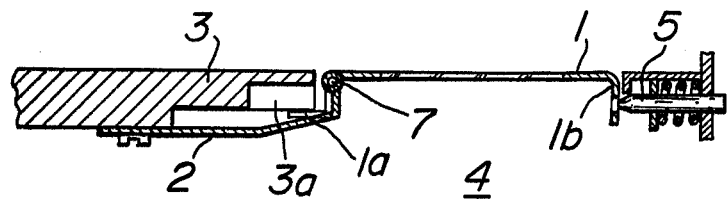
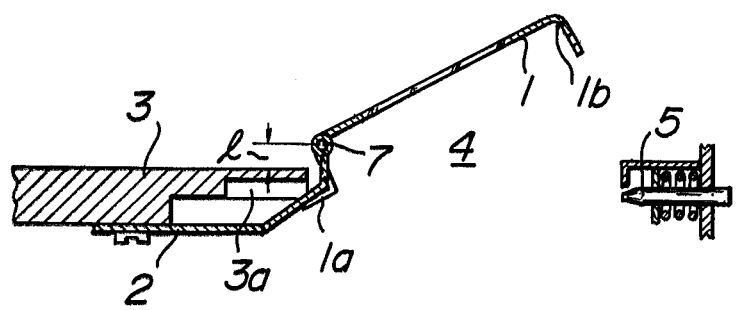
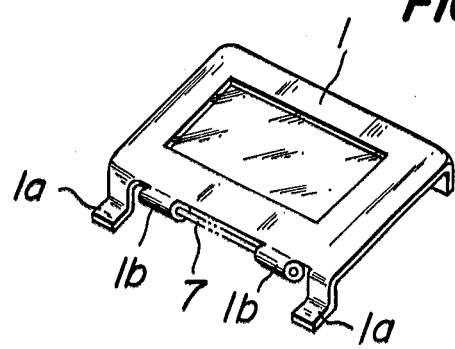
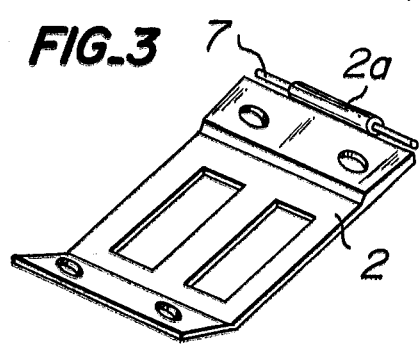

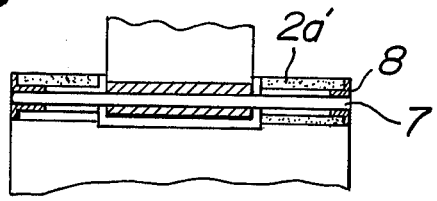
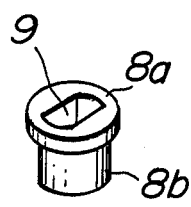
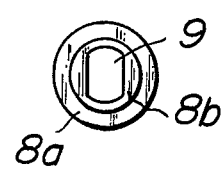
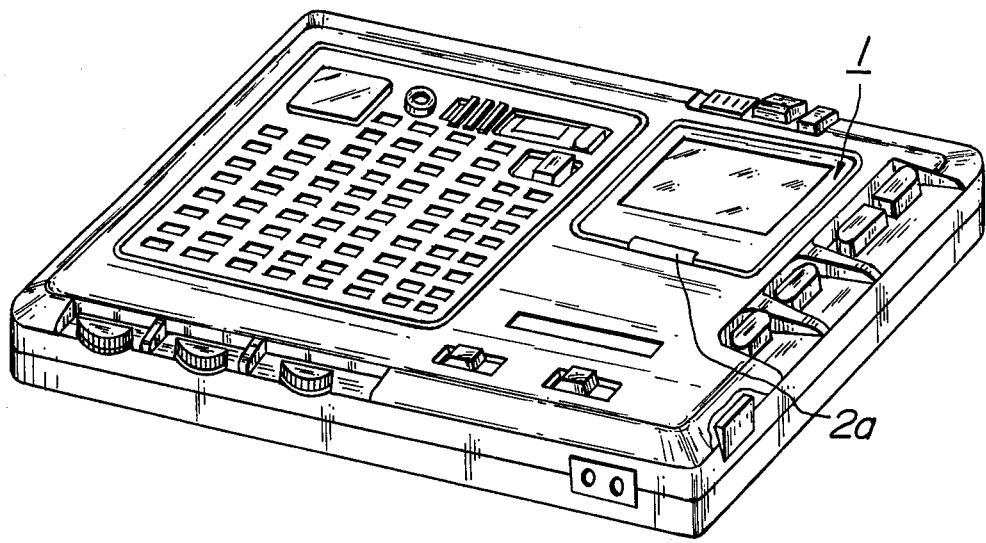

MEANS FOR OPENING AND CLOSING A LID OF CASSETTE TAPE RECEIVER PORTION

BACKGROUND OF THE INVENTION

1. Field of the Invention

The present invention relates to a means for opening and closing a lid on the cassette tape receiver portion of a cassette tape recorder.

2. Description of the Prior Art

In a means for opening and closing a lid of a cassette receiving or inserting portion for a cassette tape, opening angle of the lid is often made up to 180° for easily inserting in or taking out the cassette tape.

If the opening angle of the lid is made 180°, however, a mandrel portion of a hinge provided at the side end of the lid is secured upwards, so that the mandrel portion is exposed on the surface of the lid and it looks unattractive in design.

SUMMARY OF THE INVENTION

An object of the present invention is to eliminate the above described defects of the conventional means for opening and closing a lid on the cassette tape receiver portion of the cassette tape recorder.

Another object of the present invention is to provide a means for opening and closing a lid on the cassette tape inserting portion of a cassette tape recorder in which a hinge portion of the lid is prevented from being exposed on the lid surface while the opening angle of the lid is made possible up to 180°.

A means for opening and closing a lid on the cassette tape receiver portion of a cassette tape recorder comprises a casing having an opening portion, a lid body having a projection formed at a side end to be rotated for opening and closing the opening portion of the casing, a spring plate for rotatably supporting the lid body through a hinge connection and including a mandrel, the lid being directed downwards and its free end portion being bent upwards against the side end fixed in the casing, and an abutment provided in the casing for engaging the projection of the lid body when closing the lid body. A portion of the casing for receiving the lid body is provided with a projection to make the lid body open by tapping the lid body. The hinge connection comprises cylinder portions each formed at end of the lid body and the spring plate, a common mandrel extends through the cylinder portions and the mandrel is provided at both ends with a sleeve for adjusting the extent of the connection.

BRIEF DESCRIPTION OF THE DRAWING

FIG. 1a and FIG. 1b are cross-sectional views showing one embodiment of means for opening and closing a lid on the cassette tape inserting portion according to the present invention;

FIG. 2 is a perspective view of a lid body;

FIG. 3 is a perspective view of a spring plate;

FIGS. 7 and 8 are a cross-sectional view and a perspective view showing a protection member for the casing of cassette tape recorder; and FIG. 9 is a perspective view of a cassette tape recorder using a means for opening and closing a lid to the cassette tape inserting portion according to the present invention.

DESCRIPTION OF THE PREFERRED EMBODIMENT

Figure 4:
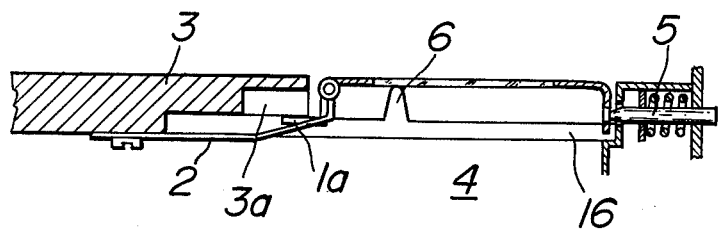
FIG. 4 is a cross-sectional view showing another embodiment of the means according to the present invention.

Referring now to FIG. 1 one embodiment of a means for opening and closing a lid on the cassette tape inserting portion of a cassette tape recorder is shown.

In FIG. 1, reference numeral 1 is a lid body, this lid body 1 is formed with L-shaped projections 1a, 1a at both sides of a rotatable side end as shown in FIG. 2, and between these projections 1a, 1a is formed cylindrical portions 1b, 1b of a hinge. The lid body 1 is rotatably connection to a spring plate 2. The spring plate 2 is bent upwards at the end portion from the secured side end by a predetermined angle as shown in FIG. 3, the other cylindrical portion 2a of the hinge is formed, and to this cylindrical portion 2a is engaged the cylindrical portions 1b of the lid body 1 and connected by a mandrel 7 so as to rotatably support the lid body 1.

Reference numeral 3 is a casing of a cassette tape recorder having a cassette tape inserting portion or space 4, and to this casing 3 is fixed a side end of the spring plate 2. The spring plate 2 is fixed to open and close the cassette tape inserting portion 4 by the lid body 1. As shown in FIG. 1b, when the lid body 1 is under the opening condition, the hinge portion is positioned above the casing surface by a level l.

The casing 3 is formed with a projection 3a opposedly to the L-shaped projection 1a of the lid body 1. As shown in FIG. 1a, when the lid body 1 is in the closed condition, the projections 1a is engaged with the projection 3a. With such construction, when the lid body 1 is rotated in the clockwise direction for closing the cassette tape inserting portion 4, the lid body 1 is engaged with the projection 3a of the casing 3 at its projections 1a, and then the lid body is rotated around this portion so that the inserting portion 4 is closed. Under such condition, if the lid body 1 is locked with a locking member 5, this closed condition is maintained. In this case, between the lid body 1 and the spring plate 2 the hinge portion is suspended by engagement of the projections 1a with the projection 3a downwardly to position the same surface as that of the casing 3. The hinge portion is directed downwards at the cylindrical portion, so that the hinge portion is prevented from being exposed on the casing surface.

As shown in FIG. 1b, when the locking condition with the locking member 5 is released for opening the cassette inserting portion 4, the lid body 1 is rotated in the counter-clockwise direction by restoring force of the spring plate 2 and engagement of the projections 1a with the projection 3a is released. The hinge portion between the lid body 1 and the spring plate 2 is then lifted from the casing surface by the amount l, and as a result, if the lid body 1 is further rotated in the counter-clockwise direction, the lid can be opened by 180° against the surface of the cassette inserting portion 4. If a spring (not shown) for rotating the lid body 1 in the counter-clockwise direction is provided in the hinge, the lid body 1 is automatically rotated in the counter-clockwise direction and opened by 180° against the surface of the cassette tape inserting portion 4.

FIG. 4 shows a means for automatically opening a lid of cassette tape inserting portion of cassette tape recorder. In this embodiment at least one projection 6 is provided at the frame portion the lid body and between the hinge connection and the free end portion of the lid.

When the lid is made to open the portion between the hinge connection of the lid body and the projection 6 is pushed or patted by a finger of the operator. The lid is then opened automatically. This projection 6 may be formed an the casing of the tape recorder or the frame portion of the lid body.

Figure 5:
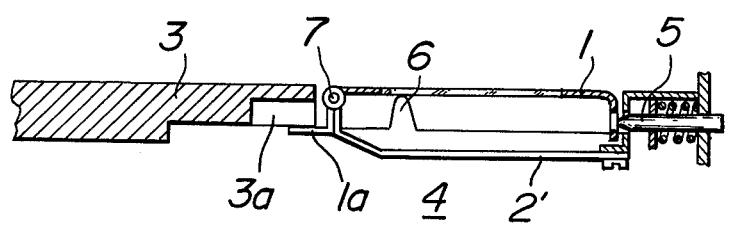
FIG. 5 is a cross-sectional view showing further embodiment of the means according to the present invention.
Figure 6:
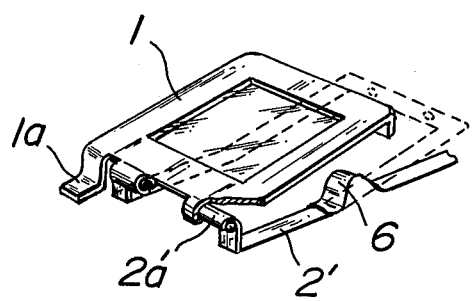
FIG. 6 is a perspective view of the lid body and the spring plate shown in FIG. 5.

FIGS. 5 and 6 show another embodiment of means for opening and closing the lid of cassette tape inserting portion. Similar reference characters refer to similar elements or members in FIGS. 1 to 3. In this embodiment a spring plate 2' is fitted to another portion of the casing 3. As shown in FIGS. 5 and 6 one end of the spring plate 2' is fixed to the casing 3 at the free end side of the lid body 1. The other end of the spring 2' is connected to the hinge connection of the lid body 1 so that the spring plate 2' and the lid body 1 are arranged in a stacked condition. The operation of means for opening and closing the lid according to this embodiment is the same as that of means for opening and closing the lid shown in FIGS. 1 to 3.

FIGS. 7 and 8 show a protection means for the lid body. If the lid body 1 and the spring plate 2 or 2' are loosely connected with each other and the lid body is strongly hit against the surface of the casing 3 by spring provided in the hinge when engagement of the lid and the casing is released, and as a result, the surface of the casing is scratched.

According to the present embodiment a sleeve 8 is inserted into the cylindric portion 1b or 2a of the lid body 1 or spring plate 2'. The mandrel 7 is inserted into a hole 9 of the sleeve 8. The degree of connection of the lid and the spring plate can be adjusted by changing the shape of the hole 9.

This means for opening and closing the lid of the cassette tape inserting portion is used in a cassette tape recorder as shown in FIG. 9.

According to the present invention, in the case of closing the lid body, the hinge portion is prevented from being exposed on the case surface, and the opening angle of the lid can be made 180°, so that the cassette tape can easily be inserted in or taking out with fine appearance in design.

The present invention is not restricted to the above embodiments but incorporates variations and modifications within the scope of the claim. For example, the aforementioned embodiments are the case of applying the present invention to a tape recorder casing, but the present invention can naturally be applied to the other casings.

What is claimed is:

1. A means for opening and closing a lid on a cassette tape receiver portion comprising a casing having an opening portion, a lid body having a projection formed at a side end to be rotated for opening and closing the opening portion of the casing, a spring plate for rotatably supporting the lid body through a hinge connection and having a mandrel and being directed downwards and its free end portion being bent upwards against the side end fixed in the casing, and an abutment provided in the casing for engaging the projection of the lid body when closing the lid body, whereby the hinge connection is positioned above the surface of the casing by a predetermined amount when the lid body is opened.

2. A means for opening and closing a lid on a cassette tape receiver portion as claimed in claim 1, wherein a portion of the casing for receiving the lid body is provided with a projection to make the lid body open by tapping the lid body.

3. A means for opening and closing a lid on a cassette tape receiver portion as claimed in claim 1, wherein the hinge connection comprises cylinder portions each formed at an end of the lid body and the spring plate, a common mandrel is extended through the cylinder.

4. A means for opening and closing a lid on a cassette tape receiver portion as claimed in claim 1, wherein the spring plate has one end which is fixed to the casing at the hinge connection side of the lid body and has other end which is connected to the hinge connection of the lid body thereby to arrange the casing and the lid body in a straight line when the lid is closed.

5. A means for opening and closing a lid on a cassette tape receiver portion as claimed in claim 1, wherein the spring plate has one end which is fixed to the casing at the free end side of the lid body and has other end which is connected to the hinge connection of the lid body thereby to arrange the spring plate and the lid body in a stacked condition when the lid is closed.

* * * * *